May 24, 1932. R. A. FESSENDEN 1,859,621
APPARATUS FOR SETTING TO BEST PHOTOGRAPHIC EXPOSURE
Filed May 9, 1927
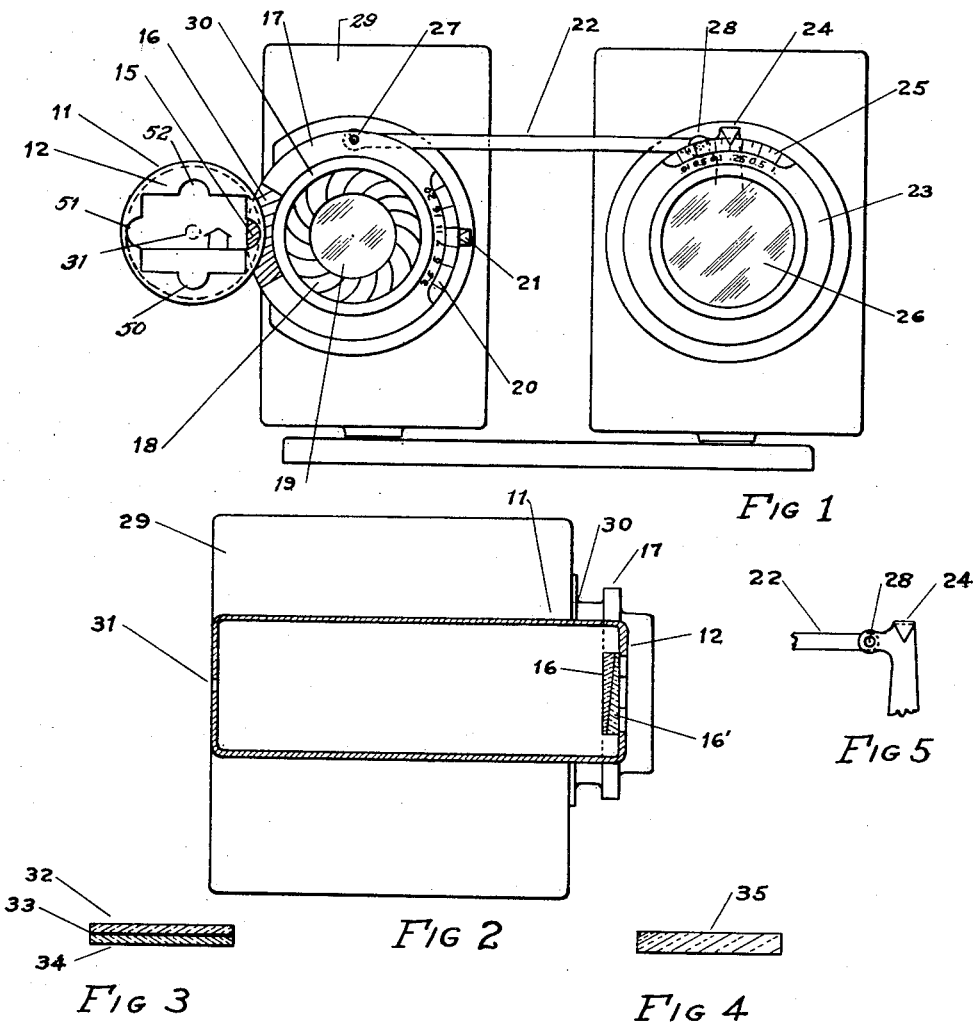
INVENTOR
Reginald A. Fessenden
BY
Ezekiel Wolf
ATTORNEY Patented May 24, 1932

1,859,621

UNITED STATES PATENT OFFICE

REGINALD A. FESSENDEN, OF CHESTNUT HILL, MASSACHUSETTS

APPARATUS FOR SETTING TO BEST PHOTOGRAPHIC EXPOSURE

Application filed May 9, 1927. Serial No. 189,985.

My invention relates to apparatus for increasing the efficiency of operations which require a more or less definite time of exposure to the actuating influence; and more especially to photography.

It has for its object the attainment of said increased efficiency; and more particularly the convenient, rapid and accurate determination of the amount of exposure to be given in taking photographs; and still more particularly, the automatic setting of the amount of exposure by the act of measuring the amount of exposure to be given, and more especially, while looking through the view finder.

The accompanying drawings show, partly diagrammatically, means adapted for the carrying out of my invention. Fig. 1 shows the exposure meter arranged to actuate the iris diaphragm of one camera and the timing mechanism of another camera. Figure 2 shows a side view in section of the arrangement. Fig. 3 shows an alternative form of the photometer element, Fig. 4 still another form and Fig. 5 shows a detail.

In Fig. 1, 11 is the tube of a view finder, a longitudinal section of which is shown in Fig. 2, 31 being the eye opening. This view finder may be equipped with lenses, as well known in the art, or as shown, without them; the lenses, while for most work preferable, not being essential.

12 is the mask defining the field of the view finder, this being, as shown, a rectangle, with four lunettes 15, 50, 51 and 52 or semicircular openings one in the middle of each side, as shown, which aid in selecting the field of the picture to be taken.

30 is the mounting tube of the lens of a moving picture camera 29, in which is the iris diaphragm 18, controlling the lens opening, 19, and therefore the exposure. 17 is the rotating flange which adjusts the opening of the iris diaphragm. 20 is a scale, showing the diaphragm opening, or other suitable function of the exposure, and 21 the indicator.

A section of the flange 17 is cut away, and in it is set the wedge photometer, (or other suitable type), either secured, as is well known in the art, by a flange, as used for similar purposes, or, as shown, cemented in. A cross section of this photometer 16, is shown in Fig. 2 at 16, 16'. Here 16' is a wedge of strongly light absorbent glass, and preferably of a color which allows only, or mainly, that part of the spectrum to pass which is adapted to best act upon the photographic film, to produce the desired photograph; such glasses being well known in the art. 16 is a similarly shaped wedge, used mainly for purposes of mechanical strength; though if found convenient or desired, it may have other purposes, e. g. it may be the light filter to let through the right spectrum band or bands, and 16' may be the light absorbing element, thus dividing up the functions to be performed. If used for mechanical strength, and not for light selection, 16 is cemented to 16' in any suitable way, e. g. by Canada balsam, and is of clear glass.

The lens tube 30 and finder tube 11 are so placed relatively to each other that the photometer 16 is seen by the observer using the view finder, to cover the left hand lunette, 15 as shown, and the photometer prism 16' subtends the same angle that the flange 17 rotates through in changing the iris diaphragm 18 from its largest to its smallest opening, and the thickness and taper and light absorbing and selecting qualities of 16' are so chosen and proportioned that when the iris diaphragm is set at the right opening to give the best picture, (after development of the photographic film), that part of the photometer prism 16' which will just allow the object which is being photographed to be seen, (or will just shut it out, or other suitable arrangement), is opposite the lunette 15.

In operation, therefore, if it is desired to get a good photograph of the object, the observer looks through the finder and moves it so that a portion of object is seen through the lunette 15, looking of a bluish color where the photometer wedge covers it. Still looking at it, the observer rotates 17 until he can just see the object through the lunette 15, (or just not see it), and when this is the case, the iris diaphragm is set for the right exposure, and all that remains to be done is to push the button, the whole operation being almost instantaneous, i. e. taking with a little practice, less than one second.

In deciding just when the object to be photographed is just visible, (or just not visible), the particular feature which is desired to have come out best should be observed. For example, in photographing a man whose face is tanned, who is seated under trees, the face should be observed.

No allowance of any kind has to be made, e. g. for time of day, etc. as the wedge reads the amount of actinic light suited to the film.

The right hand of Fig. 1 shows the invention applied to a camera in which the exposure is controlled by the timing of the shutter, and not by the opening of the diaphragm, (or not solely), and which, as shown, is operated in conjunction with a movie camera, so that any particular view may be taken to larger size, or on glass, or for other purpose.

Here 22 is a light rod, rotatably attached by pins, 27, 28, to the flange 17 and pointer 24 respectively of the lenses, the pointer 24, on rotation, adjusting the time of exposure, indicated by the scale 25 and pointer 24. 26 is the fixed (or variable if desired) opening of the second lens. The operation is the same as that described for the other lens, i. e. the moving picture lens, the only, or main, difference being that when the observer looks through the finder and rotates the flange 17 or the pointer 24, he adjusts the time of the exposure, and not the opening of the lens.

Figure 3 shows a second form of photometer. Here 32, 34 are two thin plates of plain glass, with an absorbing sheet or film, 33, between them. The absorption of the film is graduated from one end to the other, as in the case of the wedge 16', but the graduation is obtained by variation in the amount of the absorbing material in the film, instead of variation in thickness. A convenient way of obtaining the absorbing film is to take a thin photographic plate, e. g. lantern slide, and give a strip of it which has been cut to the proper length, a graduated exposure, the exposure increasing from one end to the other, so that the absorption of light through the developed and fixed film will have the right values, i. e. will taper to correspond with the iris diaphragm openings. The film may be stained with some suitable light fast dye, which lets through the right spectrum bands, which dyes are well known in the art.

Figure 4 shows a third form of photometer, in which 35 is a plate of glass or other suitable material, in which the absorbing material is graduated from end to end This is more difficult to manufacture, but applicant has had success with it.

Different photometer elements, as 16, 16', may be furnished to suit different type of plates or films, or lenses.

In the latest cameras placed on the market the user, before taking a picture, has to consult a table, to find the exposure, and to take into account the following elements:—1, Month; 2, Time of day; 3, Weather; 4, Altitude; 5, Nature of scene; 6, Distance, etc., the instructions covering two pages. The advantage of a method in which, while observing the scene to be photographed, through the view finder, a flange is rotated which automatically sets for the right exposure, independently of all other things, will be appreciated. It solves a problem as old as photography.

A new and important function is accomplished by placing the measuring element of the photometer in the field of view of the view finder, in that, for physiological and other reasons the photometer readings are made much more accurate.

A plurality of photometer wedges of different constants may be attached to the same lens flange.

What I claim is:—

1. In combination with a camera having an iris diaphragm, a lens and a concentric flange for adjusting the opening of the lens, means for determining the proper lens opening comprising means set in the periphery of said flange adapted to provide an indication of correct light intensity, a view finder positioned adjacent to said flange and having a side portion thereof intercepted by the peripheral means in said flange whereby when said flange is rotated various portions of said means will intercept said view finder.

2. In combination with a camera having an iris diaphragm, a lens and a concentric flange for adjusting the opening of the lens, means for setting the adjustment at the proper lens comprising means set in the periphery of said flange adapted to provide an indication of correct light intensity, a view finder positioned adjacent to said flange having small projected portions thereof extending in the line of vision of said last means whereby when said means is set for a correct light intensity the lens will have the proper opening.

3. In combination with a camera having an iris diaphragm, a lens and a concentric flange for adjusting the opening of the lens, means for setting the adjustment at the proper lens opening comprising a composite varying light absorbing element composed of two united elements having a constant combined thickness, said means being formed in an arc and set in the periphery of said flange, a view finder positioned adjacent to said flange and having a side portion thereof intercepted by the peripheral means in said flange whereby when said flange is rotated various portions of said means will intercept said view finder.

4. In combination with a camera having an iris diaphragm, a lens, and a concentric flange for adjusting the opening of the lens, means for setting the adjustment at the proper lens opening comprising a composite varying light absorbing element composed of two united elements having continually varying thickness, said means being formed in an arc and set in the periphery of said flange, a view finder positioned adjacent to said flange and having a side portion thereof intercepted by the peripheral means in said flange whereby when said flange is rotated various portions of said means will intercept said view finder.

REGINALD A. FESSENDEN.